UNITED STATES PATENT OFFICE.

JOHN LEONARD KELLOGG, OF BATTLE CREEK, MICHIGAN, ASSIGNOR TO KELLOGG TOASTED CORN FLAKE COMPANY, OF BATTLE CREEK, MICHIGAN, A CORPORATION OF MICHIGAN.

MANUFACTURE OF BEVERAGE EXTRACTS.

1,189,128.  Specification of Letters Patent.  Patented June 27, 1916.

No Drawing.  Application filed October 23, 1915. Serial No. 57,422.

*To all whom it may concern:*

Be it known that I, JOHN LEONARD KELLOGG, a citizen of the United States, residing in Battle Creek, in the county of Calhoun and State of Michigan, have invented a new and useful Improvement in the Manufacture of Beverage Extracts, (Case I,) of which the following is a specification.

My invention relates in general to the manufacture of beverage extracts from the starch-bearing materials such as wheat, corn, rye, barley and other cereals, beans, peas, nuts, taro and arrow root. These extracts are preferably concentrated in liquid or dry comminuted form and are intended to be dissolved in hot water to be used as a healthful beverage in place of coffee and other beverages less healthful.

In the invention forming the subject of the present application, I use the algarroba bean as the principal starch-bearing material.

In order that my invention may be fully understood I shall first describe in detail one mode in which I now prefer to perform my process, and then define in the claim the spirit and scope of the invention.

In carrying out my process in the present preferred mode, the algarroba beans in sufficient quantity are first thoroughly washed and dried, roasted and ground into a coarse powder. The pulverized, dried and roasted algarroba beans are then steeped in hot water and all the extractive material is washed from the product by means of percolation. The extract is then evaporated to a thick syrup, preferably in a vacuum drier, to a density of 30° to 40° B. This syrup is then caramelized by the usual methods until it has a bitterish sweet flavor, and is of a very dark color, similar to the color found in commercial caramel. The product is then mixed with, by preference, wheat bran which has been previously dried by the usual method and roasted to a dark golden brown color. The roasted bran and caramelized algarroba bean extract is then, by preference, mixed with roasted wheat and rye, in about the proportions of one-third roasted wheat, one-third roasted rye, and one-third roasted bran and algarroba bean extract. Before making this mixture or blend, all the products are ground so that they may be blended and mixed easily. The roasted materials are then mixed with water and the extractive materials extracted in solution by percolation. This solution which was old prior to my invention but which has never to my knowledge been concentrated into liquid or dry form prior to my invention is then boiled down *in vacuo* to a thick syrup, testing approximately 40° B. The syrup is then reduced to a dry comminuted condition, preferably by placing it in a vacuum drier, drying it to bone dryness, and then grinding it into a powder of the desired fineness. The resulting product is quickly soluble in water, is very palatable and healthful, has the general flavor and characteristics of coffee, and is in other respects a greatly improved coffee substitute.

The improved product herein described is made by me the subject of a separate application for patent Serial No. 57,423, filed by me herewith.

I claim as my invention:

The process of making a soluble beverage extract during the performance of which algarroba beans are roasted and comminuted, the soluble contents thereof extracted, concentrated and caramelized, the caramelized extract mixed with comminuted roasted cereal, and the soluble contents of the mixture extracted and concentrated.

JOHN LEONARD KELLOGG.